Aug. 12, 1958  P. N. NELSON  2,847,026
FLOAT VALVE CONSTRUCTION
Filed Nov. 4, 1957
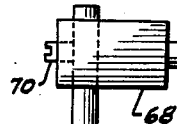
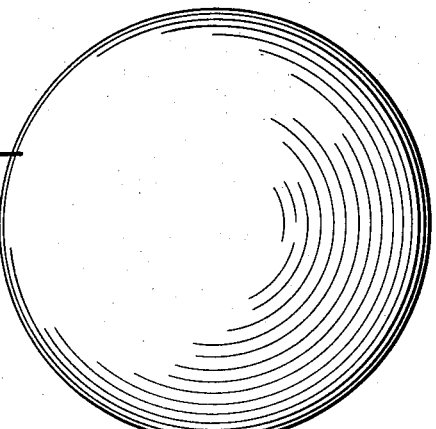
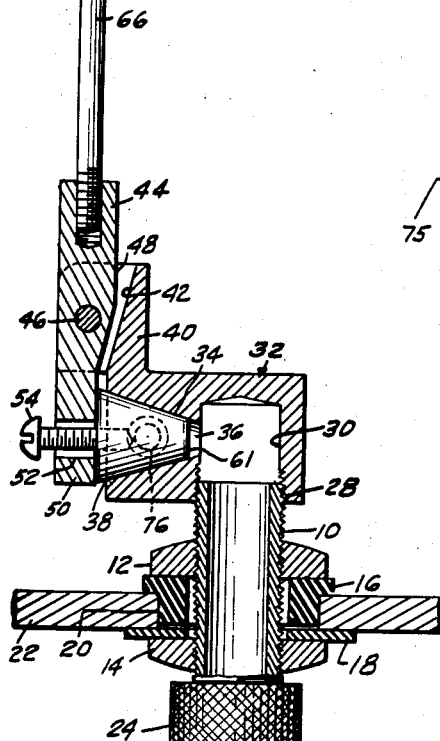
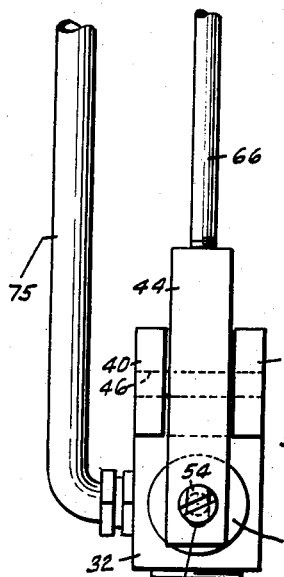
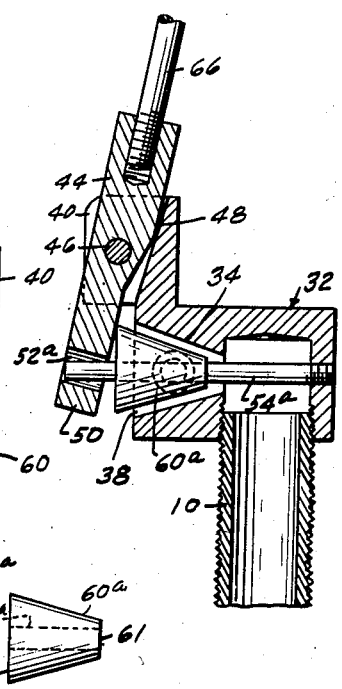
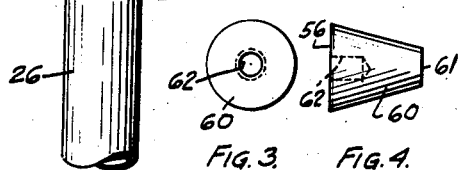
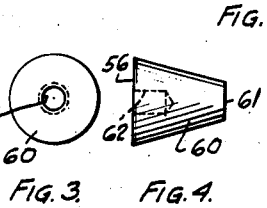
INVENTOR.
PERMIL N. NELSON
BY
*Harry H. Hilgeman*
ATTORNEY.

United States Patent Office 2,847,026
Patented Aug. 12, 1958

2,847,026

FLOAT VALVE CONSTRUCTION

Permil N. Nelson, Galesburg, Ill., assignor to Lynn H. Ewing, doing business as Black Hawk Company, Rock Island, Ill.

Application November 4, 1957, Serial No. 694,446

3 Claims. (Cl. 137—434)

My invention relates to improvements in valve construction.

My invention relates more particularly to improvements in float operated inlet valves of the general type that are used in water reservoirs of flush toilets. These valves are usually operated by the lowering of a float ball when a toilet is flushed, and permit water to enter the reservoir of the closet bowl to a level which is determined by the float ball, which operates through connected mechanism with a valve and port in the water inlet line from the plumbing system of the building.

The principal object of the present invention is to provide a comparatively simple yet highly efficient valve housing and plug valve which is operated by a float ball to control the flow of water into the reservoir of a flush toilet from the inlet line of the plumbing system.

A further object of the invention is to provide float control mechanism for actuating a tapered or plug valve, the tapered or plug valve being directed by, yet sufficiently independent of the operating mechanism so that it is subject to pressure from the inlet line of the plumbing system to push the same to permit water to flow through the valve housing, and subject to pressure by the operation of the float valve to seat in the valve housing to close off the supply from the plumbing system. In its operation to either an open or a closed position, the plug valve is free to float and is only operable by pressure against one or the other end of the same, so that it will always find its own seat in closing.

Other objects and advantages of the structure will be more apparent from the following description, wherein reference is had to the accompanying drawings, upon which:

Fig. 1 is a vertical cross-sectional view through the bottom wall of the water closet tank or reservoir showing my improved float valve construction mounted therein and generally shown in vertical cross-sectional view, with the inlet valve closed and the water level supporting the float ball in a generally horizontal position;

Fig. 2 is a fragmentary side elevational view of the valve housing, valve operating lever, and replenishing tube which is usually provided with this type of valve;

Fig. 3 is a front view of the hard rubber plug valve showing the screw hole for mounting the same on the screw in the structure shown in Fig. 1;

Fig. 4 is a side elevational view thereof;

Fig. 5 is a fragmentary vertical sectional view of a modified form of mounting for the plug valve;

Fig. 6 is a front elevational view of the plug valve used in the construction of Fig. 5; and Fig. 7 is a side elevational view thereof.

In the embodiment of the invention which I have chosen to illustrate and describe the same, I have shown the usual water supply conduit 10 which is fastened by means of a pair of locking nuts 12 and 14 and the compressible washers 16 and 18 through a suitable opening 20 in the bottom wall 22 of the water closet reservoir to which the conduit is connected. Below the water closet reservoir I provide a knurled shoulder nut 24 for fastening the inlet water supply tube 26 to the supply conduit 10.

The supply conduit 10 is threaded throughout its length and is attached at its upper end to a tapped opening 28 at the end of the bore 30 vertically disposed in the valve housing 32. The valve housing 32 may have a frusto-conically shaped horizontally disposed side opening 34 terminating in the port 36 communicating with the bore 30, and a side opening 38 communicating with the inside of the water closet reservoir.

The housing 32 has a pair of raised lugs 40 that have a sloping back wall 42 to provide a channel-shaped opening to receive a pivotally mounted valve operating lever 44, the lever 44 being mounted upon a pivot pin 46 journalled in the lugs 40. The lever 44 may have an offset shoulder 48 which strikes against the sloping wall 42 when the float ball is lowered and the valve is open, as will be more clearly described hereinafter.

The lever 44 has a reduced head 50 which has an elongated slot 52 therethrough to receive a set screw 54 that is screw-threadedly mounted in the front end 56 of a tapered plug valve 60. The valve 60 has a tapped opening 62 in the front end of the same to receive the screw member 54. The upper end of lever 44 may be connected by a rigid rod 66 to a connector block 68 by means of a set screw 70, the connector block 68 being at the end of a transversely directed stem 72 of a hollow float ball 74.

With the construction shown, when the toilet is flushed and the level of the water in the water closet reservoir drops, the float ball 74 will drop, swinging the valve lever 44 about the pivot 46. The head 50 of the lever 44 will strike against the back of the set screw 54 and further swinging movement of the lever about the pivot 46 would withdraw the plug valve 60 from the chamber 34 in the valve housing 32 and permit water to flow into the reservoir. In ordinary operation, however, the second the head 50 is moved away from the front 56 of the plug valve 60, so that pressure does not keep the valve seated, the pressure of the water in the supply line 26 will push against the reduced end 61 of the plug valve 60 and unseat the same to permit the flow of water into the reservoir. This would continue until the level rises to where the float ball 74 is in a horizontal position as shown in Fig. 1, and the head 50 of the valve lever would press against the end 56 of the plug valve to seat the same in the chamber 34.

As can be seen, I also provide a tubular connection 75 extending upwardly from a port 76 in the side of the valve chamber 34, the tube 75 communicating with the usual conduit with which the toilet bowl is replenished with a supply of water after each flushing.

In Figs. 5, 6 and 7 I have shown a modified form of plug valve wherein the plug valve 60a has an axial bore 62a therethrough so that it may reciprocate upon a guide rod 54a that is screw-threadedly mounted in the back wall of the valve block 32, the guide rod extending outwardly and engaging in an elongated opening 52a in the valve lever 44 in the same manner that the screw member 54 is engaged in the structure shown in Fig. 1. The only difference between these two structures resides in the fact that the plug valve 60a, being slidably mounted on the guide rod 54a, is in a position to float into or out of seating engagement with the valve chamber 34, its action being entirely governed by the pressure of the water in the supply conduit 10 to open the valve when the toilet is being flushed, and the valve being manually pushed back to seating position by the lever head 50 when the float ball rises to a horizontal position.

From the foregoing description it will be apparent that I have provided a float operated inlet valve constructed of comparatively few parts, one in which the plug valve is movable into and out of seating position by means of the differences in the pressures in the supply line and the water level in the reservoir, the moving parts being so constructed that they will not easily become broken or out of order.

I contemplate that changes and modifications may be made in the exact details shown, and I do not wish to be limited in any particular; rather what I desire to secure and protect by Letters Patent of the United States is:

What is claimed:

1. A float operated valve of the type described comprising a vertical standpipe for attachment through an opening in the bottom wall of a water closet reservoir, a valve body having a vertical bore, said bore being tapped for mounting on the top of said standpipe, a horizontally disposed frusto-conically shaped valve chamber in said housing having its smaller end communicating with said bore, a tapered plug valve horizontally reciprocal to open or close said valve chamber, said plug valve having a headed medial stem, a valve operating lever having a wall adjacent the larger end of said plug valve, said lever having an elongated slot through said wall, said stem extending through said slot with its head beyond said wall, a pair of arms extending upwardly from said valve housing, a pivot pin mounted through said arms, said valve operating lever mounted on said pivot pin, a rod extending upwardly from said lever and a float ball connected to the end of said rod, said valve operating lever adapted to have its wall engage behind said head to move it and the plug valve away from said valve chamber whenever said float ball is lowered and return said plug valve to closing position by having its adjacent wall engage the larger end of said plug valve to push the same.

2. A float operated valve of the type described comprising a vertical standpipe for attachment through an opening in the bottom wall of a water closet reservoir, a valve body having a vertical bore, said bore being tapped for mounting on the top of said standpipe, a horizontally disposed frusto-conically shaped valve chamber in said housing having its smaller end communicating with said bore, a guide rod mounted in the wall of said housing and extending outwardly through said valve chamber and said bore from the wall of said housing, a tapered plug valve horizontally reciprocal to open or close said valve chamber, said plug valve having a medial bore and being slidably mounted on said guide rod, a valve operating lever, said lever having an arm engaging the larger end of said plug valve, a pair of spaced arms extending upwardly from said valve housing, a pivot pin mounted through said arms, said valve operating lever mounted between said arms on said pivot pin, a rod extending upwardly from said lever, a block connected to the top of said rod, a float ball, a stem from said float ball, said stem connected to said block, said lever operable to move said plug valve to closed position and said plug valve moved to open position by water pressure in said standpipe.

3. A float operated valve of the type described comprising a vertical standpipe for attachment through an opening in the bottom wall of a water closet reservoir, a valve body having a vertical bore, said bore being tapped for mounting on the top of said standpipe, a horizontally disposed frusto-conically shaped valve chamber in said housing having its smaller end communicating with said bore, a guide rod mounted in the wall of said housing and extending outwardly through said valve chamber and said bore from the wall of said housing, a tapered plug valve horizontally reciprocal to open or close said valve chamber, said plug valve having a medial bore and being slidably mounted on said guide rod, a valve operating lever, said lever having an arm engaging the larger end of said plug valve, a pair of spaced arms extending upwardly from said valve housing, a pivot pin mounted through said arms, said valve operating lever mounted between said arms on said pivot pin, a rod extending upwardly from said lever, a block connected to the top of said rod, a float ball, a stem from said float ball, said stem connected to said block, said lever operable to move said plug valve to closed position and said plug valve moved to open position by water pressure in said standpipe, said arm of said lever having an elongated slot therethrough to receive said guide rod.

References Cited in the file of this patent

UNITED STATES PATENTS

| | | |
|---|---|---|
| 791,382 | Turro | May 30, 1905 |
| 1,178,349 | Rockey | Apr. 4, 1916 |
| 1,442,206 | Witherspoon | Jan. 16, 1923 |
| 2,240,560 | King et al. | May 6, 1941 |
| 2,793,655 | Matthews | May 28, 1957 |